May 12, 1953  S. COHN ET AL  2,637,991
FABRIC TREATING SYSTEM
Filed Oct. 1, 1946  5 Sheets-Sheet 1
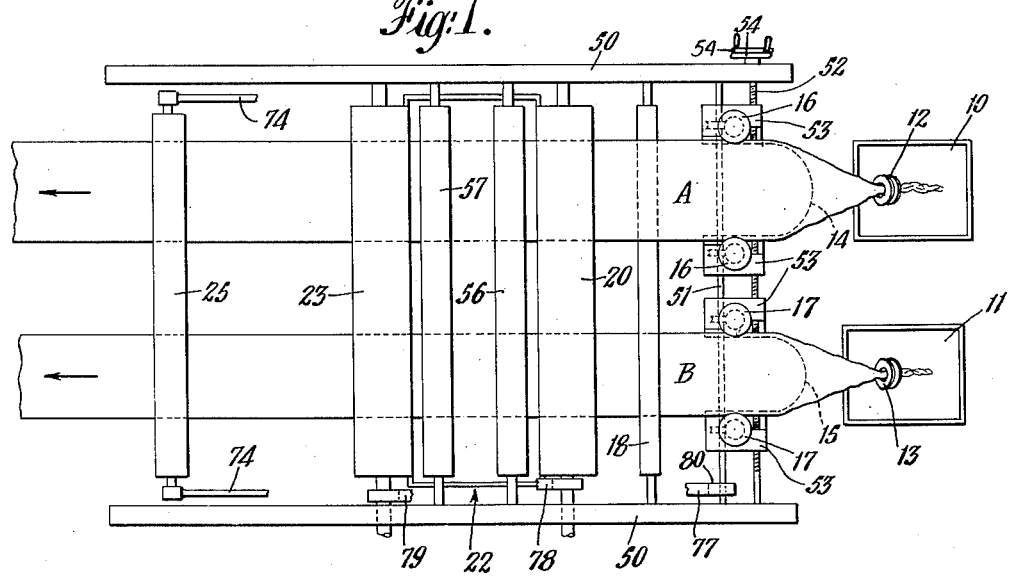
Fig. 1.
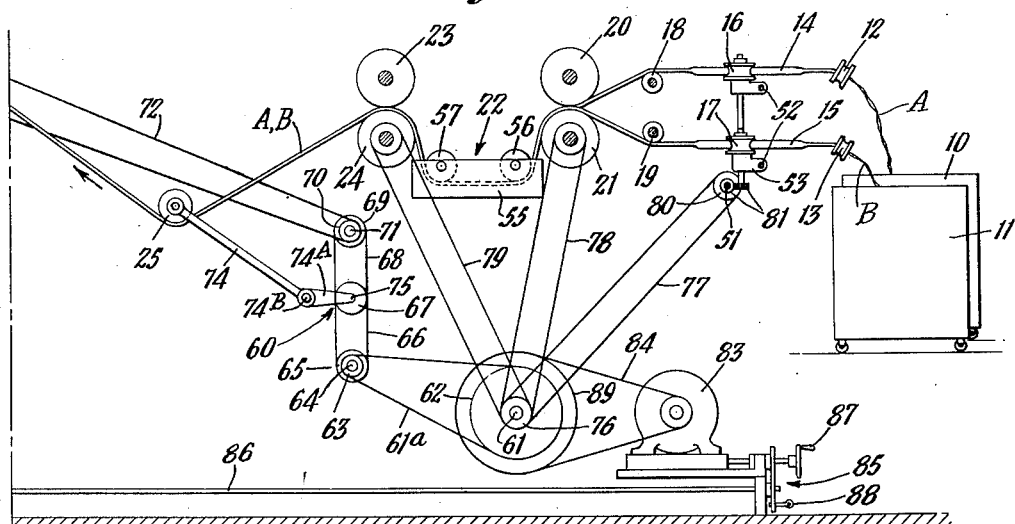
Fig. 2.
Fig. 3.
Samuel Cohn and
Jules G. Walter
INVENTORS
BY Frank A. Bower
ATTORNEY

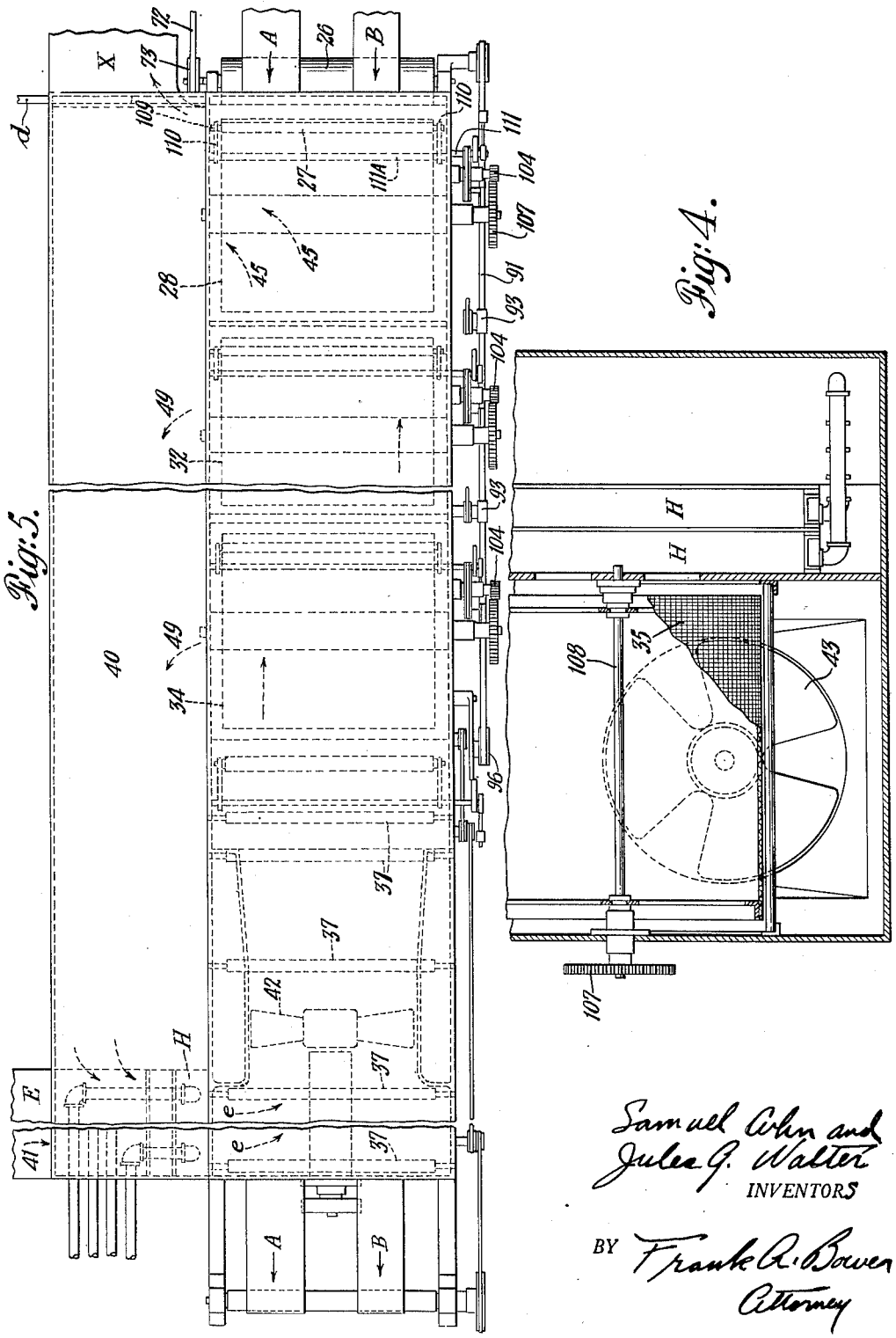

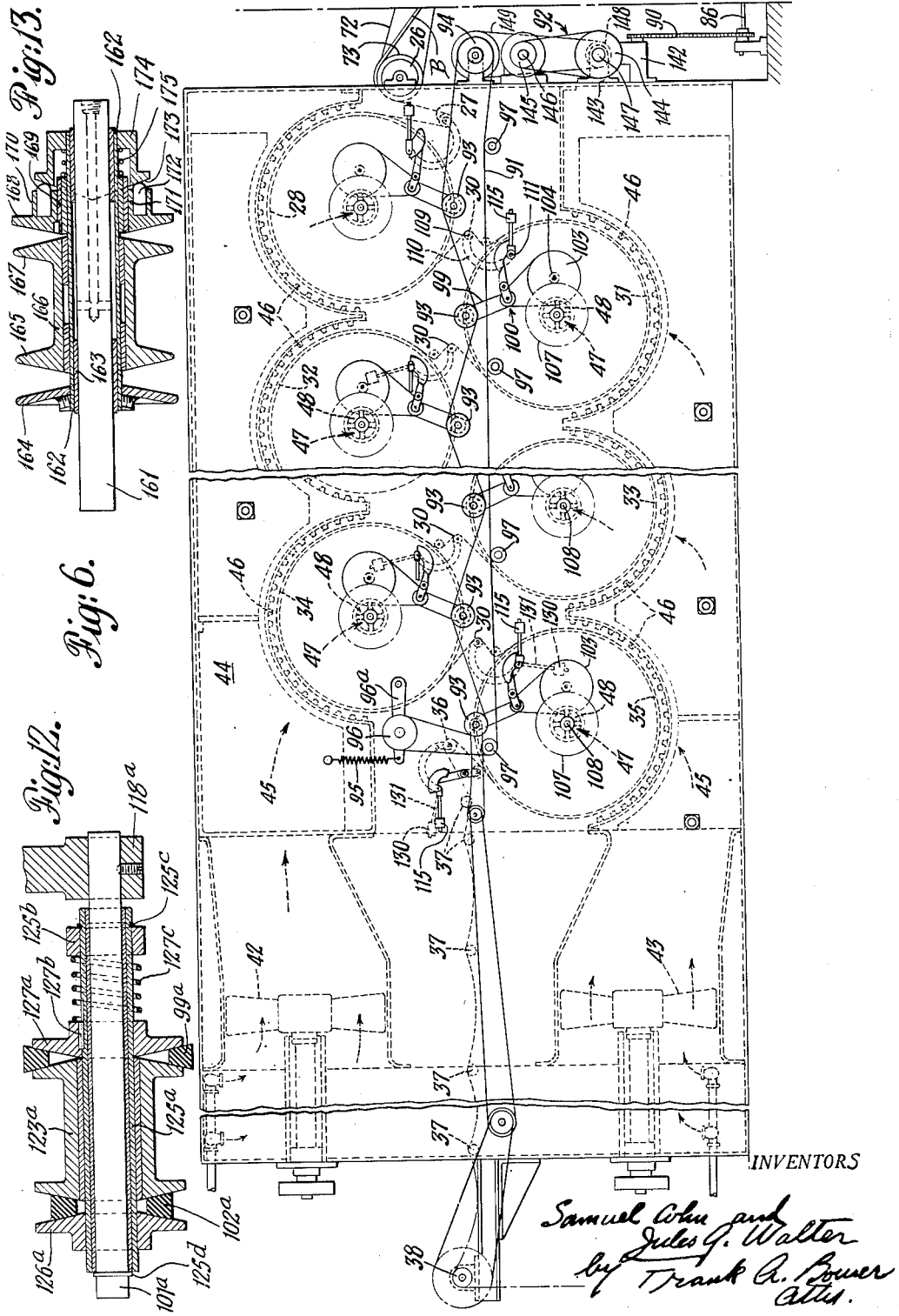

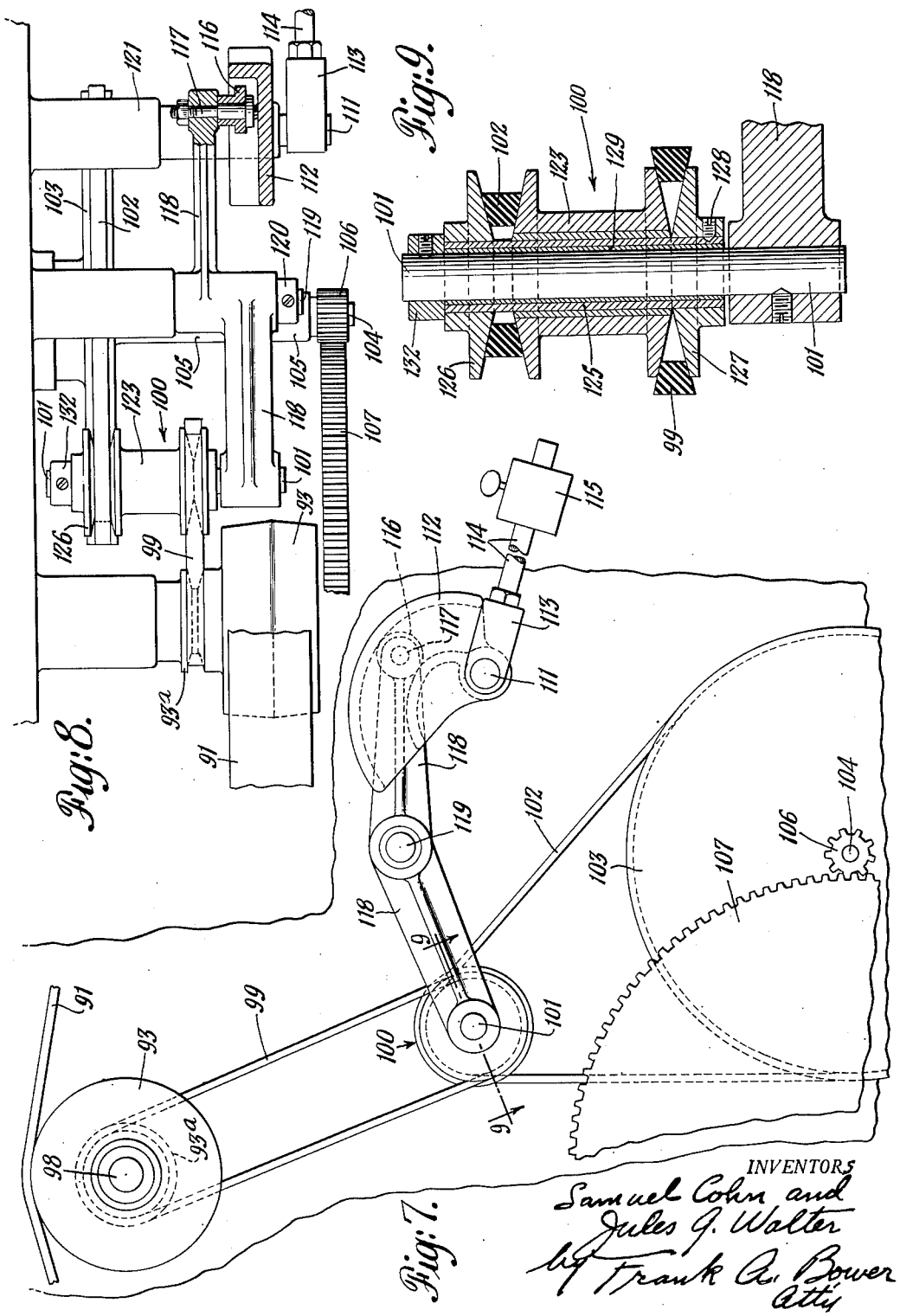

May 12, 1953  S. COHN ET AL  2,637,991
FABRIC TREATING SYSTEM
Filed Oct. 1, 1946  5 Sheets-Sheet 5
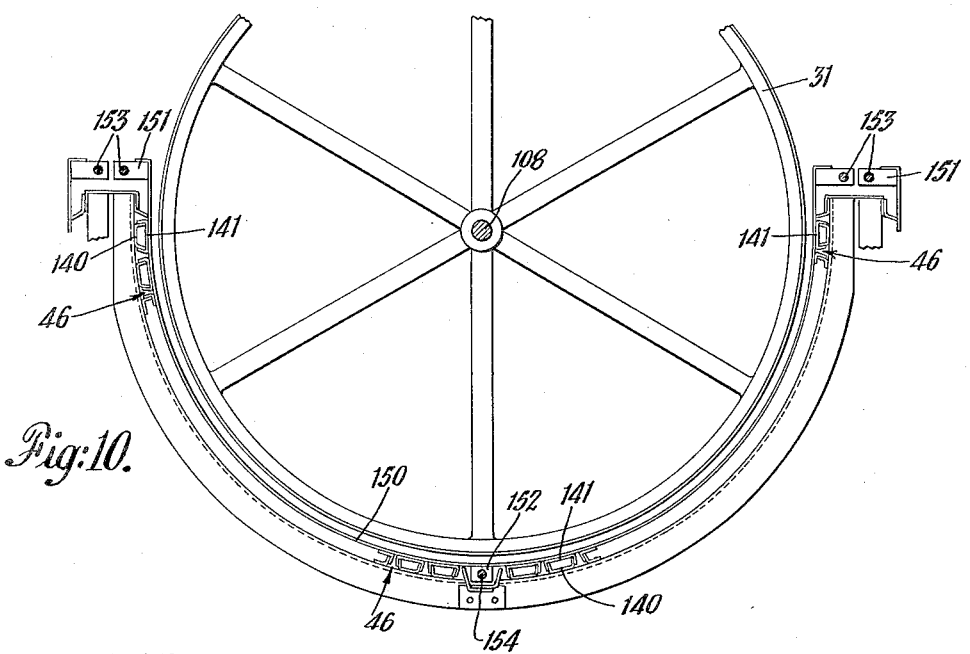
Fig:10.
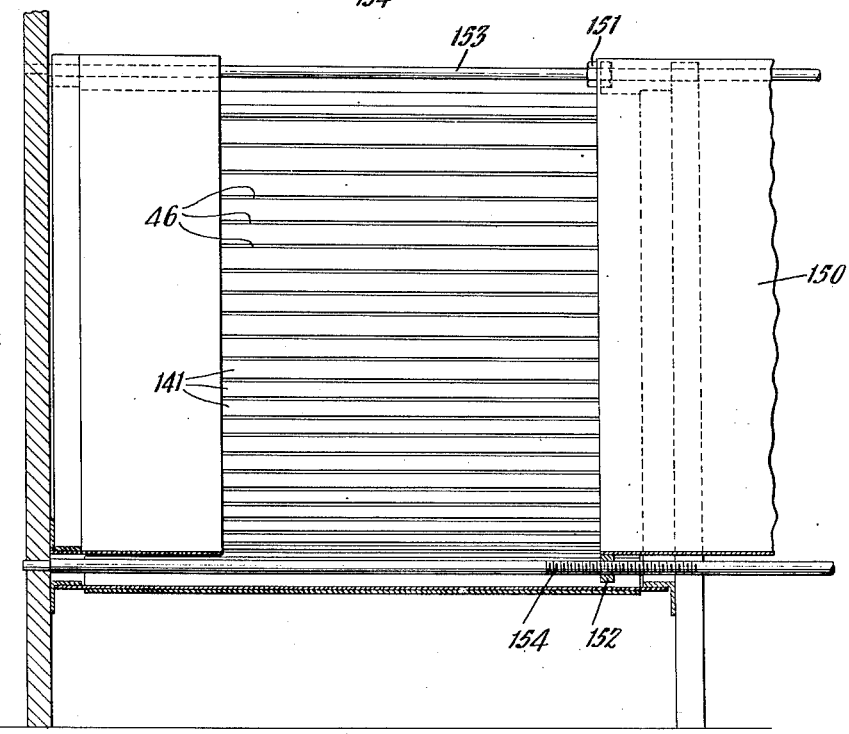
Fig:11.
INVENTORS
Samuel Cohn and
Jules G. Walter
by Frank A. Bower
ATTORNEY Patented May 12, 1953

2,637,991

UNITED STATES PATENT OFFICE 2,637,991

FABRIC TREATING SYSTEM

Samuel Cohn, New York, and Jules G. Walter, Ridgewood, N. Y., assignors to Samcoe Holding Corporation, Woodside, N. Y., a corporation of New York Application October 1, 1946, Serial No. 700,536

14 Claims. (Cl. 68—20)

This invention relates to method and apparatus for treating, drying and conditioning textile fabrics.

The object of the invention is to provide a system for continuously running strips of fabric through a series of operations including a final controlled drying and delivery of the fabric partly conditioned and smooth and regular in texture.

Further objects of the invention, particularly in the apparatus involved and the simultaneous feeding of a plurality of parallel strips of fabric will appear from the following specification taken in connection with the accompanying drawings, in which Fig. 1 is a diagrammatic plan view of the entrance end of the system;

Fig. 2 is a side view corresponding to Fig. 1;

Fig. 3 is a showing on enlarged scale of a portion of Fig. 2;

Fig. 4 is a partial sectional view looking toward the discharge end of the dryer;

Fig. 5 is a plan view showing the air circulation for the dryer;

Fig. 6 is a side elevation showing the air circulation and the driving means for the dryer drums;

Fig. 7 is a side view on enlarged scale of the portion of the control for the drive of the dryer drums;

Fig. 8 is a plan view of the same;

Fig. 9 is a sectional view taken on the line 9—9 of Fig. 7;

Fig. 10 is a partial elevational view of a drying drum with air distributing means at its periphery;

Fig. 11 is a similar side view of the air distributing means for the drum shown in Fig. 10;

Fig. 12 is a sectional view of a T-pulley illustrating a modified construction; and Fig. 13 is a view similar to Fig. 12 showing a further modified form of pulley construction.

Referring to Figs. 1 and 2, the baskets 10, 11 contain the fabric usually wet from a previous washing. The cloths A and B are taken from the baskets, passed up through stationary poteyes 12 and 13 and thence over internal propeller mechanisms 14 and 15 of the type shown in Cohn Patent No. 2,130,118 supported and driven by side rolls 16, 17. The cloth then passes around guide rolls 18, 19 and through squeeze rolls 20, 21 which extract excess water after which it may pass through solution impregnation system 22 (see Figs. 2 and 3), and thence through squeeze rolls 23, 24 which remove excess chemicals. In these squeeze rolls 20, 21 the fabric strips are converged to flat distended form and under tension, longitudinally and transversely, the excess water being squeezed out with the fabric under this tension. Similarly in the squeeze rolls 23, 24 the fabric is in flat form under longitudinal tension and these rolls may be set to have any desired liquid content in the fabric strips either more or less than the content at delivery from squeeze rolls 20, 21. The cloth now in wrinkle-free flat condition passes under speed control dancer roll 25 (Figs. 1 and 2) and thence to the first inlet roll 26 of the dryer D (Fig. 6).

The fabric in entering the dryer D (Fig. 6) passes over roll 26 at a speed automatically controlled as hereinafter explained. The cloth then passes downwardly around speed control dancer roll 27 in the dryer and thence upwardly over the cloth supporting and driving drum member 28 which has its periphery composed of a suitably air pervious material so that it is possible, although supporting the cloth, for the air to penetrate through the cloth on this member. Any desired number of these drying drums may be used. The cloth after leaving the first member 28 passes downwardly over dancer 30 and thence to the second supporting and driving member 31. The cloth thence travels in a manner similar to that just described through the balance of the drying zones under a succession of dancer roll controls and over drum members 32, 33, 34 and 35 until it arrives at a point where it has passed the last driving member 35. From thence it is preferred to lead the cloth over dancer 36 after which it passes under and over idlers 37 to a driven draw roll 38 from whence it may be either folded or lead to any subsequent operation.

An important advantage of this system is the feeding of either one or more strings or strips of fabric A, B, this being attained by the control of the supply of the strips in combination with the control of the feed as hereinafter explained. The dryer cylinders feed both strips A and B at substantially the same rate regulated from cylinder to cylinder by a dancer roll control between the cylinders. Where the fabric strips are of different characteristics and in particular different rates of shrinkage, a compensating adjustment of the relative rates of feed into the dryer has been found to be automatically distributed through the successive drying steps to permit both strips to be carried through together without excessive tensioning or slacking of either.

This relative adjustment of the rates of feed is attained by variation of the amount of material fed by the propellers 14, 15 (Figs. 1 and 2). Preferably the propeller drive rollers 16, 17 are driven at the same rate of speed, the widths of the propellers within the tubular material being relatively varied to feed more of the material showing the greater shrinkage. These propellers being for instance as shown in Cohn et al. Patent No. 2,228,001 may be adjustable in width during the running of the fabric and the wider the adjustment the more of the fabric of greater shrinkage will be drawn and fed to the treating mechanism and the dryer. Then in the dryer the relatively greater amount of shrinkage encountered will be offset and supplied from the increased width or amount of material without overstretching the fabric or subjecting it to undue tension in any direction. It will feed along with the strip of less shrinkage under the same controls.

In the propeller structure the side frames 50 (Fig. 1) rotatably support the adjusting screw rods 52 and the transverse drive shaft 51 (Fig. 1 and Fig. 2) geared to the drive rolls 16, 17. Supporting brackets 53 slide freely on shaft 51 and are threaded to rods 52 which are turned by hand-wheels 54 to adjust the width of each propeller separately.

In this way for identical peripheral speeds of rollers 16, 17 the relative feeds of the two strips A, B may be set and readjusted from time to time. For example, the operator may observe a tendency of one of the strips in the dryer to tighten or slack and the compensating adjustment to correspondingly increase or decrease the width of the propeller for that strip may be made. During the running of the machine slight microadjustment of the relative speeds of rollers 16, 17 may be made.

The typical chemical treatment before drying carries the strips through the solution 59 in pan 55 passing them from the squeeze rolls 20, 21 under the solution rolls 56, 57 and then between squeeze rolls 23, 24. The solution 59 is maintained at a low level L (Fig. 3) below the point at which the fabric A, B comes into contact with the roll 56 so that the cloth and the roll surface are pressed together before the fabric is carried down into the solution on the surface of the roll. Any air or gas trapped between the roll surface and fabric is thus released through the fabric openings before they are closed by the solution and "bubbling" or "ballooning" of the wetted fabric is obviated and the feed is kept uniform with smooth even passing of the cloth through the treatment 22 and the squeeze rolls 23, 24.

Between these rolls 23, 24 and the dryer feed roll 26, the control dancer 25 rests on both fabric strips A, B and through speed control mechanism, designated generally at 60 (Fig. 2) varies the speed of the roll 26 (Figs. 5 and 6) to maintain a desired rate of feed of roll 26 with respect to the feed from the squeeze rolls. The preliminary drive from the baskets through squeeze rolls 23, 24 is set at desired rate in relation to the separate drive for the dryer and the feed roll 26 which is preferably driven from the preliminary drive through belting and control 60 operated by dancer 25 to regulate the rate of rotation of roll 26.

The drive of the inlet roll 26 is taken from the same main drive output shaft 61 which drives the balance of the processing in advance of this inlet roll. The first step of this inlet roll drive has a large sprocket 62 mounted on shaft 61 and driving by belt 61a to sprocket 63 on jack shaft 64. A pulley 65 is attached to sprocket 63 and this assembly 65 and 63 will revolve freely on fixed stud 64.

A V-belt 66 from pulley 65 drives to one of the grooves in T-pulley 67 on floating stud shaft 75. The other groove in T-pulley 67 accommodates a second V-belt 68 which drives to V-belt pulley 69, which, in turn, is fastened to another sprocket 70, the pulley 69 and sprocket 70 having suitable connection so that the assembly 69 and 70 may revolve freely around fixed stud 71. A chain 72 drives from sprocket 70 to sprocket 73 located on the same shaft which accommodates the inlet roll 26.

In operation, when the cloth A, B has a tendency to slacken, the dancer roll 25 follows the cloth down and the arm 74$^A$ carrying T-pulley 67 is an integral part of the dancer roll arm 74 and located so that it acts as a lever and swings in an arc determined by its distance from the center of the T-pulley to the center of the fixed stud 74$^B$, changes the center distance between pulley shafts 75, 71 and 64 and increases the speed of sprocket 70 as roll 25 drops and arm 74 tips counterclockwise and the pitch diameter of driving belt 66 on pulley 67 shrinks and the pitch diameter of driven belt 68 on said pulley increases causing inlet roll 26 to speed up in accordance with the demand of the lowering of dancer roll 25. Conversely, the lifting of the dancing roll reverses this action and slows down inlet roll 26, as set forth hereafter in describing similar mechanism in the dryer drive.

If, when the drive is stopped, the overrun or coasting of the processor is greater than the overrun or coasting of the dryer, the inlet roll 26 will simply run this amount of cloth into the dryer so that it hangs in a loop. Immediately after the drive is again started up, the first dancer 27 inside the dryer will follow this loop down and call for a higher speed of the first dryer reel to correct this condition, the slack being then redistributed to the succeeding reels by dancers 30.

The pre-treatment mechanism (Fig. 2) is driven from the main shaft 61 through pulleys 76, belt 77 to the propeller mechanism, chain 78 to the squeeze rolls 20, 21 and chain 79 to the squeeze rolls 23, 24. Belt 77 drives pulley 80 on shaft 51 connected through gearings 81, one for each of the shafts of the drive rolls 16, 17.

The dancer roll control 25, 60 varies the speed of the roll 26 to compensate for variations in the material as it passes through the preliminary treatment in advance of the dryer. The dancer roll 25 can only drop as far as permitted by the tension of the strip A or B which feeds the slower and is therefore the more taut. Therefore, the entrance roll 26 will only feed at a rate corresponding to the demand of this slower strip and the excess of feed of the faster strip appears as slack at the dancer roll 25 which slack when it develops and persists serves as a guide to the operator to adjust the corresponding propeller 14, 15 to feed at a slower rate. Or conversely the propeller of the slower strip may be adjusted to feed the material at a faster rate.

The cloth strips are thus fed to the dryer on roll 26 at separately controlled rates and in order that the cloth in the dryer may be perfectly free during its travel to shrink or extend and revert to its natural dimensions as determined by its condition feed controls of the drums are applied through the apparatus shown in Figs. 7, 8 and 9.

This belt mechanism drives at controlled variable speeds the cloth supporting and driving members 29, 31, 32, 33, 34 and 35. Figs. 6, 7 and 8 show an endless flat belt 91 driven from drive 92 (Fig. 6) at any suitable speed in order to obtain the general drying speed of the entire range. The endless belt 91 passes over pulleys 93 in its travel from the driving pulley 94 to end idler 96 and is kept in a taut condition by the action of the spring 95 on lever 96a carrying pulley 96, the belt returning over supporting idlers 97. Each pulley 93 (Fig. 7) is in effect a double pulley consisting of a flat faced pulley in contact with belt 91 and a V-belt pulley 93A. This combination pulley 93, 93A revolves around stationary shaft 98. The V-belt 99 which passes around combination pulley 93a and is driven therefrom, drives to one of the grooves in the variable pitch pulley 100, a cross section of which taken on a line 9—9 in Fig. 7 is shown in Fig. 9. Pulley 100 revolves freely about stud 101. V-belt 102 passes around the second groove in pulley 100 and drives to V-belt pulley 103 which is fastened to one end of stub shaft 104. Stub shaft 104 which is mounted in suitable bearing 105 carries at the end opposite pulley 103 pinion gear 106 meshing with master gear 107 which is in turn fastened to driving and supporting shaft 108 of the corresponding dryer drum shown in Figs. 5 and 6. The variable pitch pulley 100 in Fig. 7 is actuated by action of the cloth A or B on the roller 30. This roller is an idler and pivoted in suitable bearings and revolves around shaft 109 held in arms 110, said arms being fastened to suitable stub shafts 111 on the outside of the dryer and 111A on the inside of the dryer shown in Fig. 5. Box cam 112 is fastened to the outside end of stub shaft 111 with additional weight clamp 113 mounted adjacent thereto carrying a rod 114 suitably locked into clamp 113. Rod 114 carries the adjustable weight 115 (Fig. 7) which is slidably mounted on rod 114. The box cam 112 is so locked on shaft 111 that its working portion engages ball bearing roller 116 which is suitably mounted by a locking stud 117 in arm 118 pivoting freely on fixed stud 119 and is properly positioned thereon by collar 120. Suitable bearings 121 are conveniently located in which stub shaft 111 with cam 112 (shown in Fig. 8) is permitted to revolve through the arc of the motion transmitted to them by the action of the cloth on dancer roll 30.

Referring now to Fig. 9, the action of the pulley 100 is as follows:

When any change in centers between shafts 98 and 101 and 104 takes place, this change results in the belts adapting themselves to new pitch diameters in the grooves of pulley 100. If, for instance, shaft 101 is moved in its arcuate motion toward shaft 98, then this distance is decreased and the belt 99 shown in Fig. 7 will be forced to adapt itself to a larger pitch diameter in its groove because the center distance between shaft 101 and shaft 104 has been increased which results in belt 102 being forced down into its groove on pulley 100. As the action of belt 102 being forced down into the pulley by an increase in center distance between shafts 101 and 104 becomes felt, it forces center disk 123 shown in Fig. 9 against belt 99 and since the pulley is rotating during this action, belt 99 is crowded or forced to a larger pitch diameter, and since the one center distance between shaft 98 and shaft 101 has been decreased an amount equal to that which has increased the center distance between shafts 101 and 104, it must follow that both belts 99 and 102 although having changed their relative positions in the pulley 100 still remain taut. The action of disk 123 just described is possible because this disk is slidably mounted on tube 125. End disk 126 is an integral part of tube 125 and therefore has no lateral motion with relation to said tube. End disk 127 is located in proper position on tube 125 after which set screw 128 locks this disk to tube 125. The entire pulley 100 revolves freely around shaft 101 on bushing 129 and is held in place by collar 132.

In the specific form of T-pulley shown in Fig. 9, the disk 127 is attached to the sleeve 125 by set screws, the disk 126 at the opposite end being a press fit on the same or sleeve 125. In order to compensate for belt stretch and belt wear, disk 127 is adjusted laterally on the sleeve 125 until a proper running condition is found and wear compensated for. In Fig. 12 a modified construction is shown embodying a self-adjusting and compensating combination which will automatically perform the manual shift and thus keep the belts in proper running condition at all times.

The sleeve 125a is long enough to accommodate the spring 127c and the spring-holding disk or collar 125b held by lock ring 125c. The spool disk member 123a slides longitudinally on the sleeve 125a and with the end disk 126a maintains the V-pulley 102a under yielding pressure. Similarly, at the opposite end the belt 99a is yieldingly held between the cooperating disks, the lock ring 125d holding the sleeves in place longitudinally of the shaft 101a.

The key 127b is welded to the sleeve 125a which makes the disk 127a an integral part of this sleeve 125a as far as rotation is concerned. The disk 127a, however, has free axial slip on the sleeve 125a and is held against the belt 99a at all times by the spring 127c. Spring tension may be increased or decreased by moving the collar 125b in the direction desired.

This construction is especially advantageous in that it protects the belts or any part of the drive connected to the belts from strain due to manual forcing of the dancer arm through its range, for instance, when it becomes necessary to clear a jam in the dryer. The disk 127 may now move laterally when clearing a jam although the pulley is at rest.

In the modification shown in Fig. 13, the shaft 161 carries the sleeve 162 rotatably mounted thereon by bearings 163. At one end of the shaft 162 is fixed the disk 164 of the driven pulley, the other disk 165 of which is carried on the spool 166 rotatably and slidably mounted on the sleeve 162. At the other end of the spool 166 is the disk 167 of the driving pulley, the other disk 168 of which is mounted on the bushing 166 rotatably and slidably mounted on the sleeve 162. A ring 170 is carried by the bushing 169 of disk 168 and is recessed to provide housing 171 for graphite bearing plugs 172 engaged by the cam surface 173 of the cam barrel 174 fixed to the end of the sleeve 162 and recessed to provide a housing for the spring 175 bearing against the end of the bearing of the bushing 169 of the pulley disk 168 so as to resiliently press the pulley disks together. The cam surfaces 173 of the cam barrel are inclined as shown providing partial helices engaging the bearing plugs 172 and pressing the pulley disk 168 toward the left, and when the disk 168 is turned in either direction from the lowest points of the cam surfaces 173 with respect to the sleeve 162 and cam 174.

This gives an automatic control of the pitch diameters of the belts on the pulleys regulated by the amount of torque being transmitted. As the torque on pulley disk 168 increases, the disk is crowded toward disk 167 by the cam surfaces 173 so as to tend to increase the pitch diameter of the pulley, and this crowding is passed on through the spool 166 and disk 165 to the other driven belt also tending to increase its pitch diameter. The greater the torque, therefore, tending to draw the belts down into the grooves of the pulleys, the greater will be the resistance offered by the pulleys, and in this way any tendency to reduce the pitch diameters will be resisted and the belts will be maintained in their proper running relation irrespective of changes in the torque. While the structure and operation has been described with the pulley 167, 168 as the driving pulley and the pulley 164, 165 as a driven pulley, the same automatic stabilizing effect will take place where the drive is reversed and whether the pulley is rotated in either direction. Increase in torque will tend to correspondingly press the pulley disks toward each other to maintain the proper pitch diameter as set forth, for instance, by the position of the shaft 161 relative to the shafts of the other pulleys encircled by the belts.

In this way each different setting of the relative pitch diameters of the driving and driven pulleys is maintained closely set against variations due to changes in the driving and driven torques. The spring 175 is light and exerts just sufficient pressure to retain the parts in place with the pulley disks against the belt surfaces. The movements of the parts are promptly responsive to any shift in the relative tensions of the driving and driven belts, so that as this T-pulley is moved, for instance, by the dancer roll 30, the relative pitch diameters of the pulleys will be immediately and closely adjusted to give the desired speed control. At the same time the automatic torque compensation will maintain these pitch diameters against variation due to changes in the belt loads.

In operation, when any slight impulse on the cloth is felt by roller 30, this impulse is transmitted through the arms 110 to the shaft 111 and thence through the cam mechanism and roller giving a resultant change in the center distances between shafts 98, 101 and 104. This results in an immediate speed change of the corresponding supporting and driving drum which will follow exactly and instantaneously that called for by dancer 30. The entire dancer mechanism is carefully counterbalanced by counterweights 130 fastened to arms 131 located on shafts 111, all shown in Fig. 6. The purpose of this counterweight is to make for supersensitivity in the apparatus. The purpose of auxiliary weight 115 is to simply add that minute amount of weight which is necessary for the dancer to operate. This may be a varying factor and may be changed as different types of fabrics are run. The sensitivity of the apparatus has been obtained by using the pull of one belt over pulley 100 to exactly offset the pull of the other belt. In effect, the load between shafts 98 and shafts 101 is exactly the same as the load between shaft 101 and shaft 104 and since pulley 100 is located midway between, the amount of power necessary to move this pulley would be zero if it were not for the infinitesimal amount of friction of lever 118 on stud 119. This amount of force is obtained by additional weight 115. In order to maintain the highly sensitive control, it is preferred to locate dancer rolls 30 at those points where the fabric naturally begins to sag because it is being delivered from the previous driving member and therefore the dancer roll 30 does not force the fabric to act or react, but instead the dancer follows the cloth.

If the sag or slack is taken up by the greater shrinkage of one or the other of the strips A, B, the tendency is for the response of the feed to lower the rate of feed of the following drum, with the slowing down action being normally communicated to succeeding drums. The strip of less shrinkage, therefore, tends to accumulate slack exercising no control over the corresponding dancer roll. This condition usually will be local within the dryer and will often be automatically taken care of by slight stretching of the higher shrinkage strip and a subsequent increase of shrinkage in the other strip. Where there is a persistent and substantial shrinkage and the consequent development of excessive slack in one of the strips, the corresponding spreaders 14, 15 may be adjusted to further increase the feed of the high shrinkage strip or decrease the feed of the low shrinkage strip to permit the cloth itself in the dryer to readjust itself to the difference in shrinkage rates.

The dryer feed and the pre-treatment mechanism are driven by separate motors with a connected speed control so that their rates are relatively adjustable and also variable together. The pre-treatment drive motor 83 (Fig. 2) drives the processor through belt 84 and variable pitch pulley 89. For a given motor speed the rate of rotation of shaft 61 is varied by shifting the motor by hand-wheel 87 and so regulating the tension on belt 84 and the pitch diameter of this belt on pulley 89 of shaft 61. Hand-wheel 87 is also geared to shaft 86 through gearing 85 and clutch pin 88 so that the shaft 86 turns with hand-wheel 87 when the clutch pin 88 is in place (Fig. 2). Shaft 86 in turn is connected by chain 90 (Fig. 6) to gearing in box 142 acting to raise or lower bracket 143 carrying the variable pitch pulley 144 driven through belt 92 by pulley 145 on shaft 146 driven by the dryer motor (not shown). Pulley 144 drives shaft 147 and pulley 148 which through belt 149 drives pulley 155, shaft 156 and pulley 94 carrying belt 91. In this way the pitch diameters of pulleys 89 and 144 are simultaneously and correspondingly varied by hand wheel 87 to similarly raise or lower the speed of both the dryer and processor. Superposed upon this is an independent relative adjustment of the pre-treatment speed relative to the dryer speed by removing the pin 88 from the mechanism 85, and independently relatively shifting the motor 83 to relatively increase or decrease the speed of the pretreating mechanism.

These controls between the pre-treatment and the driver and the control of the material through adjustment of the propeller mechanisms 14, 15 accommodate the mechanisms to the handling of widely variable types of fabrics and enable the operator to quickly adjust the machine to variations occurring during the running of the strips and without interruption of the operation.

The cloth thus supported and evenly fed is subjected to drying air by circulation and recirculation carrying the currents inward in parallel through the drum peripheries and out their ends 1.

As the cloth is passed by the supporting and driving drum members, the air from fans 42, 43 passes through chamber 44 above and below the drums as indicated by arrows 45 (Fig. 6) and on through the various nozzles 46 suitably located around these driving and supporting drum members so that the air is directed through nozzles 46 and is forced against and through the cloth A and B as it passes through the drying zones. After the air has passed through the cloth A, B, on the various driving and supporting drum members, it continues within the drum members as indicated by arrows 47 toward the opening 48 located at one end and inside of the circumference of each driving and supporting drum member. The air then passes out through these openings 48 into the side spaces 40 at the end of the drums as indicated in Fig. 5 by arrows 49.

In a drying method of a recirculatory type, a certain portion of the used air is exhausted, and to accomplish this we prefer to lead a certain portion of the air used in the first drying zone as indicated in Fig. 5 by arrows 45 and out through exhaust duct X. A suitable damper d is inserted in exhaust duct X so that either all or any portion of the air used in the first drying zone may be exhausted. That portion of the air which may not be exhausted may be returned to the recirculation chamber 40 and again used. In order to obtain the proper amount of fresh air to compensate for that air exhausted and to bring the mixture of air to a proper drying mixture, it is preferred to lead fresh air as indicated by arrows 41 through duct E. The mixture of air as indicated by arrows e then passes through the heaters H where it is increased to a properly controlled temperature and then passes through blowers 42, 43. Blowers 42, 43 may be any suitable type of blower or fan and driven by any suitable mechanism. The air after leaving fans 42, 43 again passes through the drums to chambers 40 and ducts X as indicated by arrows 45 and the same cycle above described is continually duplicated. The air presesure created by the fans 42, 43 makes itself evident even to the point of forcing the air out through duct X and therefore this pressure is relied upon to force used air out of the drying chamber, conversely the same fan creates partial vacuum in supply chamber 40 and the vacuum present in chamber 40 coupled with the pressure obtained in chambers 44 creates a cycle which permits the air to travel at high speeds in a continuous circle exhausting a certain small percentage, replacing this percentage with fresh air in chamber 40 which therefore acts as a plenum chamber in returning the mixture through the heaters H following the direction of the arrows e and thence again through the fans 42, 43 which completes the cycle. We prefer to position the inlet duct E in that location where the suction of the fan is high before the air enters the heater so that the same suction of the drying fans is sufficiently high to draw the fresh air through the inlet E without making it necessary to employ the use of additional fans.

As shown in Figs. 10 and 11, the nozzles 46 of the drying drums may be formed as inwardly-tapered wedge-shaped passages between a series of hollow members formed by outer strips 140 and inner strips 141, bent and fastened together as indicated and extending from end to end of the semi-circular casing surrounding the drum members. The inner members 141 form continuous surfaces between successive nozzles and lie close to the surface of the fabric so that the air jets through the nozzles 46 are brought close to the fabric surface and forming narrow clearances of 1/8" to not over 1/2" between the fabric surface and the inner surfaces of the strips 141. This clearance should not be more than twice the width of the nozzle orifice.

The tapered narrowing of the orifices develops a high velocity in the air jets forcing the flow through the cloth. At the same time the close clearances of the inner strips 141 confine the air currents to the cloth surface and impose a relatively high resistance to endwise escape of the air.

The increase in velocity at the narrowed nozzle orifice has a Venturi effect assisting in breaking up the surface tension of the moisture in the fabric and relatively increasing the vapor pressure to give faster drying with the same amount of air.

To intercept the air from the nozzles at the areas of the drum peripheries not occupied by the drying strips, semi-circular baffles 150 are provided supported by blocks 151 at their ends and block 152 at the center. Blocks 151 slide on cross rods 153 supported in the side frames, and center block 152 is threaded on the rotatable cross rod 154 so that turning of this rod 154 adjusts the semi-circular baffle plate 150 axially between the nozzles 46 and the peripheries of the drum members. The air jets are thus controlled to be confined to substantially the width of the passing strip with corresponding concentration of the drying effect and increase in permissible rate of feed of the material so as to maintain a higher output.

The fabric strips A, B are thus subjected to a drying air current through each drum and the condition of the air as to velocity, temperature and moisture content may be accurately controlled and modified according to the requirements of the fabric. The drying immediately follows the final treatment and both operations are continuous. An outstanding feature is the handling of two or more strips with separate control of the feed of each individual feed while at the same time employing at each control station a dancer roll responding to the most taut of the strips. The system is adaptable to the needs of different fabrics and gives a smooth regular texture. It is particularly advantageous with knitted fabrics requiring careful guiding, treating and drying to attain a uniform and attractive appearance and finish of the goods.

We claim:

1. In a fabric feeding system, the combination with rolls feeding a plurality of tubular fabric strips in parallel relation with each roll in engagement with each strip, of subsequent feeding means comprising a series of rotary drums with all of the said strips engaging the periphery of each drum, and means controlling the relative rates of feed of said strips comprising an adjustable spreader in each strip, and means for separately adjusting said spreaders to different widths.

2. In a fabric feeding system, the combination with rolls constituting a preliminary feed and a series of drums constituting a subsequent feed, of adjustable spreader means controlling the rate of feed of the roll means according to the tension of the fabric therein, means between said roll feed and said drum feed automatically controlling the rate of feed to the drum means according to the tension of the fabric between said rolls and said drums, and means automatically controlling the rate of feed of the drum means according to the tension of the fabric between said drums.

3. In a fabric-feeding system, the combination with rolls constituting a preliminary feed adapted to receive and convey a plurality of tubular strips side by side and a series of drums constituting a subsequent feed for said strips, of adjustable spreader means for each strip controlling the rate of feed of the roll means, means between said roll feed and said drum feed automatically controlling the rate of feed to the drum means according to the tautness of the fabric strip least subject to elongation between said rolls and said drum, and means automatically controlling the relative rates of the feeds of the drums according to the tautness of the fabric strip least subject to elongation between said drums.

4. Speed regulating means for the rotary feed of a flexible strip feed means comprising a driving pulley, a double driven pulley belt-connected thereto, and a second driven pulley belt-connected to said double pulley and acting to drive said rotary feed means, said double pulley having a pair of V-pulleys automatically adjustable by said connecting belts to vary the pitch diameter of said belts to increase the pitch diameter of one by the decrease of the pitch diameter of the other and vice versa, and means actuated by the flexible strip for moving said double pulley to vary said pitch diameters and correspondingly control the speed of said rotary feed.

5. Speed regulating means as set forth in claim 4 in which the double pulley is mounted on a bellcrank cam-connected to a dancer roll and engaging the flexible strip.

6. Apparatus for handling a plurality of continuous strips of fabric comprising a plurality of rotary fabric conveying members adapted to receive the strips and propel them side by side back and forth around successive rotary members, a drive belt for supplying power to said rotary members to propel the strips through the apparatus at successive local points, and individual variable speed drives for said rotary members from said drive belt permitting the respective rotary members to differ in speed with relation to each other and including control means for varying the relative speeds of successive rotary members according to the tautness of the shortest length of the strips passing between each respective controlled rotary member and an adjacent driven rotary member, said control means including dancer rolls each engaging both lengths of the fabric strips passing between the rotary member to be controlled and an adjacent driven rotary member and moving between the rotary members in a transverse direction intersecting the fabric lengths engaged.

7. Apparatus as set forth in claim 6 in which the individual control means at each rotary member is separately adjustable so that the relative peripheral speeds of successive rotary members have definite predetermined differences under normal operation conditions, the variations of speed of said rotary members effected by the individual control means being superposed on said predetermined differences.

8. Apparatus for continuously treating a plurality of parallel strips of fabric which comprises means for propelling the strips side by side over a series of rotary drum members, a dancer roll riding upon the strip runs between each of said rotary members and the following member, an actuating means including a variable speed drive for each of said rotary members, means automatically controlled by the dancer roll and acting to vary the speed of the corresponding rotary member in accordance with the tautness of the least elongation of said strips between said rotary members, and means for feeding said strips to said rotary members comprising means for relatively varying the rate of feed of each of said strips with relation to the other.

9. Apparatus for continuously treating a plurality of parallel strips of tubular fabric which comprises means for propelling the strips side by said in tubular formation over a plurality of corresponding spreaders, means for varying the relative rate of feed of said strips on said spreaders, means for feeding said strips together from said spreaders into a series of rotary drum members with an intervening dancer control acting on the strip least subject to elongation, dancer rolls riding upon the strip runs between said rotary members, actuating means including a variable speed drive for each of said rotary members, and means automatically controlled by each dancer roll and acting to vary the speed of each of the rotary members in accordance with the tautness of the strip least subject to elongation.

10. Apparatus for continuously treating a plurality of parallel strips of tubular fabric which comprises means for feeding the strips side by side over corresponding spreader members, means for relatively adjusting said spreaders to control the rate of feed of each of said strips, means following said spreaders for impregnating said fabric strips and feeding them side by side to a succession of rotary members with an intervening dancer control acting on the strip least subject to elongation, a plurality of feeler devices riding upon the strip runs between said rotary members and acting upon the strip least subject to elongation, actuating means including variable speed drives for said rotary members and means automatically controlled by said feeler devices for relatively varying the speeds of said rotary members according to the corresponding vertical movements of said feeler devices.

11. In a fabric-treating and drying system, the combination with preliminary feeding means comprising successive rollers adapted to receive and convey a plurality of fabric strips side by side, of roller means for conveying and treating said strips side by side, means comprising successive rotary drums for subsequently feeding and drying said strips in side-by-side relation, means for independently regulating the rate of feed of said feeding and treating rollers as a group relative to the rate of feed of said feeding and drying drums as a succeeding group, and means for automatically controlling the rate of feed of said feeding and treating rollers relative to the rate of feed of the material by the drums in said drying means according to the tautness of the fabric strip least subject to elongation comprising a dancer roll between said roller means and said drums.

12. In a fabric-feeding and drying system, the combination with preliminary feeding means comprising successive rollers adapted to receive and convey a plurality of fabric strips side by side, of means for separately controlling the rate of feed of said strips comprising an adjustable spreader for each fabric strip, means comprising successive rotary drums for subsequently feeding and drying said strips in side-by-side relation, and means for automatically controlling the rate of feed of said preliminary feeding rollers relative to the rate of feed of material by the said drums in said drying means according to the tautness of the fabric strip least subject to elongation comprising a dancer roll between said roller means and said drums.

13. In a fabric-feeding and drying system, the combination with preliminary feeding means comprising successive rollers adapted to receive and convey a plurality of fabric strips side by side, a drive for said preliminary feeding means, of means comprising successive rotary drums for subsequently feeding and drying said strips together in side-by-side relation, a separate drive for said drums, means for independently adjusting said drums to set the rate of feed of said preliminary feeding means relative to the rate of feed of said feeding and drying means, means for simultaneously varying the rate of feed of both said drives together by a single control, and means for automatically controlling the rate of feed of said preliminary feeding means relative to the rate of feed of material in said drying means according to the tautness of the fabric strip least subject to elongation.

14. In a fabric-feeding and drying system, the combination with preliminary feeding means comprising successive rollers adapted to receive and convey a plurality of tubular fabric strips side by side, of means comprising an adjustable spreader for each fabric strip for separately controlling the rates of feed of said strips, separately driven means comprising successive rotary drums for subsequently feeding and drying said strips in side-by-side relation, and means for automatically controlling the rate of feed of said preliminary feeding means relative to the rate of feed of material in said drying means comprising means contacting said fabric strips between said preliminary feeding means and said feeding and drying means and actuated by the tautness of the fabric strip least subject to elongation.

SAMUEL COHN.
JULES G. WALTER.

References Cited in the file of this patent

UNITED STATES PATENTS

| Number | Name | Date |
|---|---|---|
| Re. 22,085 | Reeves | Apr. 28, 1942 |
| 920,351 | Layland et al. | May 4, 1909 |
| 964,088 | Chatfield | July 12, 1910 |
| 1,167,029 | Stickle | Jan. 4, 1916 |
| 1,427,437 | Breuer | Aug. 29, 1922 |
| 1,543,368 | Carrier | June 3, 1925 |
| 1,555,864 | McConnell | Oct. 6, 1925 |
| 1,692,955 | Rowley et al. | Nov. 27, 1928 |
| 1,854,604 | Steinmann | Apr. 19, 1932 |
| 2,029,854 | Cannity | Feb. 4, 1936 |
| 2,045,755 | Cohn | June 30, 1936 |
| 2,200,328 | Cohn et al. | May 14, 1940 |
| 2,210,880 | Capstaff | Aug. 13, 1940 |
| 2,228,001 | Cohn et al. | Jan. 7, 1941 |
| 2,301,249 | Butterworth et al. | Nov. 10, 1942 |
| 2,365,096 | Mothwurf | Dec. 12, 1944 |